(12) United States Patent
Eitan

(10) Patent No.: US 9,042,479 B2
(45) Date of Patent: May 26, 2015

(54) METHOD AND APPARATUS FOR AVOIDING INTERFERENCE BETWEEN COEXISTING WIRELESS SYSTEMS

(75) Inventor: Alecsander Eitan, Haifa (IL)

(73) Assignee: QUALCOMM Incorporated, San Diego, CA (US)

(*) Notice: Subject to any disclaimer, the term of this patent is extended or adjusted under 35 U.S.C. 154(b) by 1234 days.

(21) Appl. No.: 12/579,633

(22) Filed: Oct. 15, 2009

(65) Prior Publication Data

US 2010/0098135 A1  Apr. 22, 2010

Related U.S. Application Data

(60) Provisional application No. 61/106,060, filed on Oct. 16, 2008.

(51) Int. Cl.
*H04B 15/00* (2006.01)
*H04B 1/10* (2006.01)
(Continued)

(52) U.S. Cl.
CPC .............. *H04B 1/109* (2013.01); *H04B 1/525* (2013.01); *H04B 1/7163* (2013.01); *H04J 11/003* (2013.01); *H04L 5/0007* (2013.01); *H04L 5/0062* (2013.01); *H04L 27/0012* (2013.01)

(58) Field of Classification Search
CPC ........... H04L 2025/03414; H04L 2025/03477; H04L 2025/03611; H04L 2025/03617; H04L 2025/03764; H04L 2025/0377; H04L 25/03019; H04L 25/03038; H04L 5/0007; H04L 12/189; H04L 5/0041; H04L 5/0044; H04B 15/00; H04B 17/0045; H04B 17/0077; H04B 2215/065; H04B 1/1027; H04B 5/0037; H04B 5/0081; G01S 19/21; H02J 5/005; H02J 7/025; H02J 17/00; H02J 7/0027; H04W 36/18; H04W 52/243
USPC ......... 375/219, 220, 222, 259, 260, 271, 285, 375/295, 299, 302, 316, 329, 350
See application file for complete search history.

(56) References Cited

U.S. PATENT DOCUMENTS 8,054,742 B2 * 11/2011 Roh et al. ...................... 370/208
8,199,862 B2 *  6/2012 Belogolovy et al. .......... 375/346

(Continued)

FOREIGN PATENT DOCUMENTS

CN          1439198 A    8/2003
CN          1278504 C   10/2006
(Continued)

OTHER PUBLICATIONS

International Search Report PCT/US09/060993 International Search Authority European Patent Office Feb. 9, 2010.
(Continued)

*Primary Examiner* — Hirdepal Singh
(74) *Attorney, Agent, or Firm* — Jeffrey D. Jacobs

(57) ABSTRACT

Apparatuses and methods for avoiding interference between wireless systems are described herein. One embodiment of the disclosure provides an apparatus for avoiding interference between at least one transmitter and at least one receiver within at least one wireless device. The apparatus comprises a first processing circuit configured to determine whether one or more bins are affected by interference from a transmitter based on predetermined information. The apparatus further comprises a second processing circuit configured to mitigate the interference from the transmitter by at least one of the transmitter and a receiver if it is determined that the one or more bins are affected

70 Claims, 4 Drawing Sheets

(51) Int. Cl.
*H04J 11/00* (2006.01)
*H04L 5/00* (2006.01)
*H04L 27/00* (2006.01)
*H04B 1/7163* (2011.01)

(56) References Cited

U.S. PATENT DOCUMENTS

| | | | |
|---|---|---|---|
| 8,238,831 B2* | 8/2012 | Sen | 455/63.1 |
| 8,275,322 B2* | 9/2012 | Khojastepour et al. | 455/63.1 |
| 8,340,599 B2* | 12/2012 | Razzell | 455/114.2 |
| 8,543,152 B2* | 9/2013 | Sutivong et al. | 455/522 |
| 2004/0009783 A1 | 1/2004 | Miyoshi | |
| 2004/0048576 A1 | 3/2004 | Hildebrand et al. | |
| 2005/0191964 A1* | 9/2005 | Hundal | 455/63.1 |
| 2005/0254555 A1* | 11/2005 | Teague | 375/136 |
| 2006/0188003 A1* | 8/2006 | Larsson | 375/130 |
| 2007/0064835 A1* | 3/2007 | Auranen | 375/316 |
| 2007/0223608 A1* | 9/2007 | Nakayama et al. | 375/260 |
| 2008/0205544 A1* | 8/2008 | Berens | 375/285 |
| 2008/0214121 A1* | 9/2008 | Sutivong et al. | 455/67.13 |
| 2009/0013021 A1 | 1/2009 | Jhang et al. | |
| 2009/0224975 A1* | 9/2009 | Xhafa et al. | 342/357.12 |
| 2009/0257379 A1* | 10/2009 | Robinson et al. | 370/329 |
| 2009/0318087 A1* | 12/2009 | Mattila et al. | 455/63.1 |
| 2010/0165942 A1* | 7/2010 | Liao et al. | 370/329 |
| 2010/0177857 A1* | 7/2010 | Huttunen et al. | 375/350 |
| 2011/0033000 A1* | 2/2011 | Berens et al. | 375/260 |
| 2012/0178386 A1* | 7/2012 | Pascolini et al. | 455/84 |

FOREIGN PATENT DOCUMENTS

| | | |
|---|---|---|
| CN | 101002398 A | 7/2007 |
| GB | 2300546 | 11/1996 |
| JP | 2006197368 A | 7/2006 |
| JP | 2007535265 A | 11/2007 |
| JP | 2008193346 A | 8/2008 |
| TW | 200721750 | 6/2007 |
| WO | WO0237706 A1 | 5/2002 |
| WO | 2005107088 A1 | 11/2005 |
| WO | WO-2007096683 A1 | 8/2007 |

OTHER PUBLICATIONS

Written Opinion—PCT/US2009/060993—ISA/EPO—Feb. 9, 2010.
Taiwan Search Report—TW098135149—TIPO—Jan. 13, 2013.

* cited by examiner

METHOD AND APPARATUS FOR AVOIDING INTERFERENCE BETWEEN COEXISTING WIRELESS SYSTEMS

CROSS REFERENCE TO RELATED APPLICATION(S)

This application claims the benefit of U.S. Provisional Application No. 61/106,060, filed Oct. 16, 2008, the entire content of which is incorporated herein by reference.

FIELD

The present disclosure relates generally to wireless systems, and more specifically to interference avoidance between coexisting wireless systems.

BACKGROUND

Wireless devices may use multiple communication channels (e.g., WiMAX and/or 3G/4G) for transmitting and receiving information. In such wireless devices, interference issues may arise due to the relatively large bandwidth and close proximity of transmitters and receivers activated concurrently within one or separate modems for communicating on the multiple channels.

Interference causes negative effects, such as transmitter spurious emissions at the receiver's band, receiver desensitization due to transmitted signals in the transmitter allocated band, and spurious signals from the receiver and/or transmitter of one system that are affecting another system's receiver. Therefore, a need exists to reduce the negative effects of interference.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include avoiding interference between coexisting wireless systems.

One aspect of the disclosure is directed to a method of avoiding interference between at least one transmitter and at least one receiver within at least one wireless device, comprising determining whether one or more bins are affected by interference from a transmitter based on predetermined information; and avoiding the interference from the transmitter by at least one of the transmitter and a receiver if it is determined that the one or more bins are affected.

Another aspect of this disclosure is directed to an apparatus for avoiding interference between at least one transmitter and at least one receiver within at least one wireless device, comprising a first processing circuit configured to determine whether one or more bins are affected by interference from a transmitter based on predetermined information; and a second processing circuit configured to mitigate the interference from the transmitter by at least one of the transmitter and a receiver if it is determined that the one or more bins are affected.

Yet another aspect of this disclosure is directed to an apparatus for avoiding interference between at least one transmitter and at least one receiver within at least one wireless device, comprising means for determining whether one or more bins are affected by interference from a transmitter, based on predetermined information; and means for avoiding the interference from the transmitter by at least one of the transmitter and the receiver if it is determined that the one or more bins are affected.

A further aspect of this disclosure is directed to a computer-readable medium storing instructions thereon for performing a method of avoiding interference between at least one transmitter and at least one receiver within at least one wireless device, comprising determining whether one or more bins are affected by interference from a transmitter, based on predetermined information; and avoiding the interference from the transmitter by at least one of the transmitter and a receiver if it is determined that the one or more bins are affected.

Yet a further aspect of this disclosure is directed to a processor configured to execute instructions for performing a method of avoiding interference between at least one transmitter and at least one receiver within at least one wireless device, the method comprising determining whether one or more bins are affected by interference from a transmitter, based on predetermined information; and avoiding the interference from the transmitter by at least one of the transmitter and a receiver if it is determined that the one or more bins are affected.

According to certain aspects, avoiding the interference may be performed by filtering, by the transmitter, the one or more Orthogonal Frequency Division Multiplexing (OFDM) bins, for example, affecting the receiver while the transmitter is activated. According to certain aspects, avoiding the interference may be performed by attenuating, by the transmitter, transmissions at the one or more OFDM bins that affects the one or more receivers. According to certain aspects, avoiding the interference may be performed by lowering an overall transmission power of the transmitter. Of course, these techniques may be used separately, partially or in various combinations. Further, one of ordinary skill in the art would understand that the techniques described herein may be implemented for non-OFDM modems, where one can use one or more notches (fixed or configurable) at the transmitter to achieve similar results. As an example, multiple modems may be present where one or more of the modems are non-OFDM modems. In this case, one of ordinary skill in the art would understand that a band stop filter or a notch filter (fixed or configurable) at the transmitter may be used to avoid interference caused by a transmitter using various techniques described herein.

According to certain aspects, avoiding the interference may be performed by filtering, by the receiver, the one or more OFDM bins affected by the interference from the transmitter while the transmitter is activated. According to certain aspects, avoiding the interference may be performed by attenuating, by the receiver, signals at the one or more OFDM bins affected by the interference from the transmitter. Of course, this technique and those described above in paragraph [0011] may be used separately, partially or in various combinations. Further, one of ordinary skill in the art would realize that the techniques described herein may be implemented for non-OFDM modems, where one can use one or more notches (fixed or configurable) at the receiver to achieve similar results. As an example, multiple modems may be present where one or more of the modems are non-OFDM modems. In this case, one of ordinary skill in the art would understand that a band stop filter or a notch filter (fixed or configurable) at the receiver may be used to avoid interference caused by a transmitter using various techniques described herein.

It is to be understood that both the foregoing general description and the following detailed description are exemplary and are intended to provide further explanation of the claimed subject matter.

DETAILED DESCRIPTION

Figure 1:
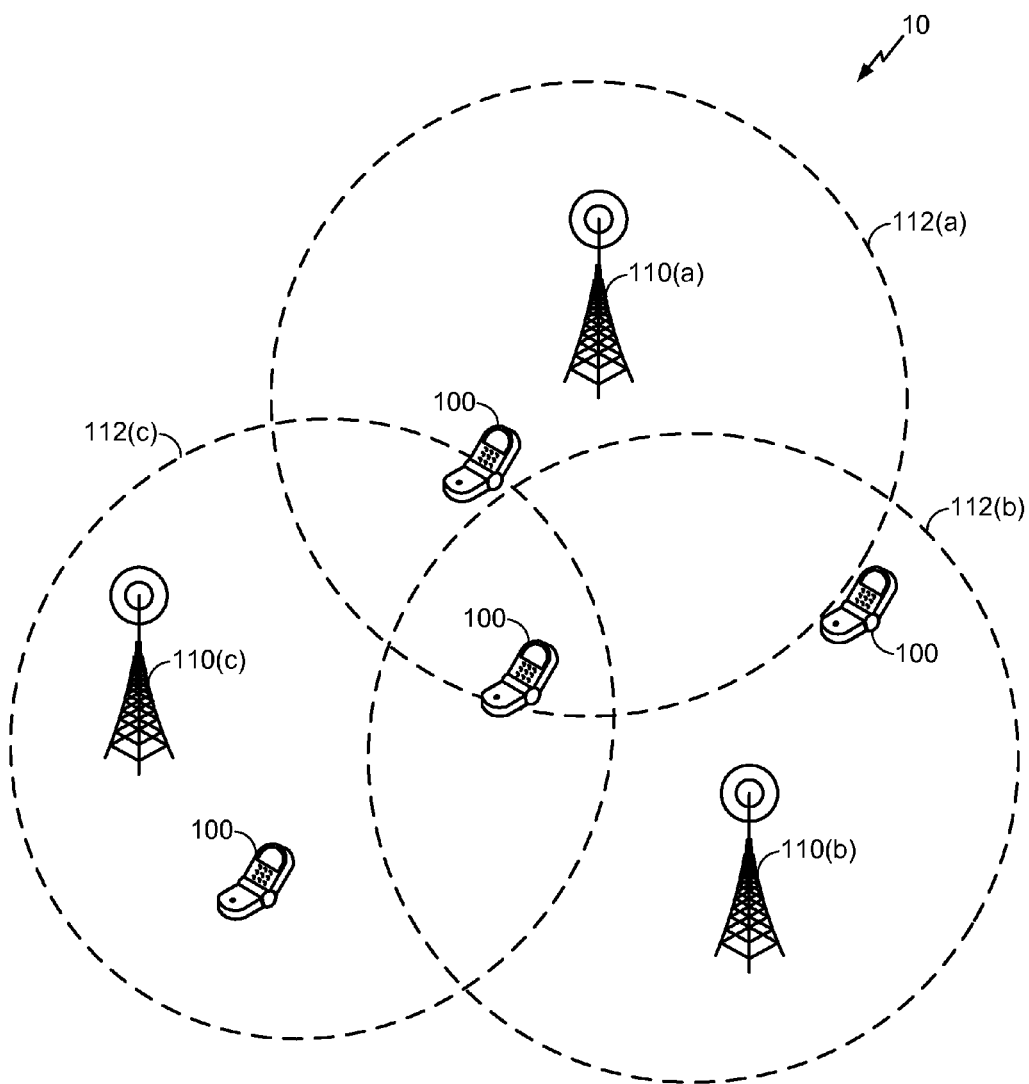
FIG. 1 illustrates an exemplary wireless communication network.

In the following detailed description, numerous specific details are set forth to provide a full understanding of the subject technology. It will be obvious, however, to one ordinarily skilled in the art that the subject technology may be practiced without some of these specific details. In other instances, well-known structures and techniques have not been shown in details so as not to obscure the subject technology.

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Methods and devices are described herein relating to simultaneous communication over multiple air interfaces and/or multiple channels. As described herein, For example, a wireless communication device may communicate over a first air interface using a first radio technology (e.g., IEEE 802.11) and may communicate over a second air interface (e.g., GSM). Further, a wireless communication device may communicate over multiple channels (e.g., frequency channels).

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Methods and systems described herein relate to interference avoidance between coexisting wireless systems. Channel structures may be used for various multiple access communication systems such as (1) a CDMA system that transmits data for different users using different orthogonal code sequences, (2) an FDMA system that transmits data for different users on different frequency subbands, (3) a TDMA system that transmits data for different users in different time slots, (4) a spatial division multiple access (SDMA) system that transmits data for different users on different spatial channels, (5) an orthogonal frequency division multiples access (OFDMA) system that transmits data for different users on different frequency subbands, and so on. An OFDMA system, for example, utilizes orthogonal frequency division multiplexing (OFDM), which is a multi-carrier modulation technique that partitions the overall system bandwidth into multiple orthogonal frequency subbands. The subbands are also called tones, subcarriers, "OFDM bins", frequency channels, and so on. Each subband, or "OFDM bin", is associated with a respective subcarrier that may be modulated with data.

In one embodiment, the methods and systems described herein relate to determining if one or more bins will be affected by interference, and avoiding such interference. Though the methods and systems are described herein with respect to an OFDM system, one of ordinary skill in the art will recognize that the methods and systems described herein may be used with other systems as well. For example, the methods and systems described herein may also apply to other modulation schemes that use frequency equalization methods.

Further, the methods and systems described herein may be for modulation schemes that do not use frequency equalization methods. Notches and/or band-stop filters may be used along with the methods and systems described herein used for such modulation schemes. These notches and/or band-stop filters may be fixed or configurable.

Some methods of interference avoidance, such as antenna isolation, antenna selectivity, receiver filters, desensitization improvements, high IP3, frequency planning, etc., may be employed with coexisting wireless systems. Such methods may have a significant impact on cost, size and power consumption of a device, and may be insufficient for dealing with systems employing wide band transmitters and/or receivers. The methods and systems described herein, however, may avoid interference without significant impact on cost, size and power consumption of a device, and may be used to deal with systems employing wide band transmitters and/or receivers.

The methods of avoiding interference between coexisting wireless systems described herein may avoid negative effects, such as spurious emissions at the receiver's band, receiver desensitization due to transmitted signals in the transmitter allocated band, and spurious signals from a transmitter of one system that are affecting another system's receiver. In one embodiment, such methods may be used for one or multiple UWB systems within a wireless device where there are coexistence interference issues due to the relatively large bandwidth and close proximity of the transmitters and receivers.

FIG. 1 illustrates an exemplary wireless communication network. The network 10 comprises a plurality of wireless devices 100 and a plurality of base stations 110(a)-110(c). Wireless devices 100 may each communicate with each base station 110(a)-110(c) over one or more air interfaces and/or over one or more channels. Each base station 110(a)-110(c) may provide communication coverage within respective coverage areas 112(a)-112(c) to wireless devices 100. The term "base station" is used as an example, and the functions of base stations 110(a)-110(c) maybe performed by any other terminal (e.g., a wireless device 100) or a tower. A wireless device 100 may move out of one or more of coverage areas 112(a)-112(c). The wireless device 100 may thereby lose communication with one or more of the base stations 110(a)-110(c) serving the coverage area from which the wireless device 100 leaves. The wireless device 100 may then acquire service from one or more base stations 110(a)-110(c) whose respective coverage area 112(a)-112(c) the wireless device 100 enters. Wireless devices 100 may refer to, for example, cellular phones, PDAs or the like, and may also be called mobile devices, user equipment (UE), wireless communication devices, terminals, stations, mobile stations, mobile equipment (ME) or some other terminology. Within a wireless device 100, one or more modems, including one or more transmitters and/or receivers, may be active simultaneously. In certain instances, one or more modems within the wireless device 100 may communicate over one or more air interfaces and/or over one or more channels. Accordingly, a plurality of transmitters and/or receivers of the wireless device 100 may communicate in parallel.

Figure 2:
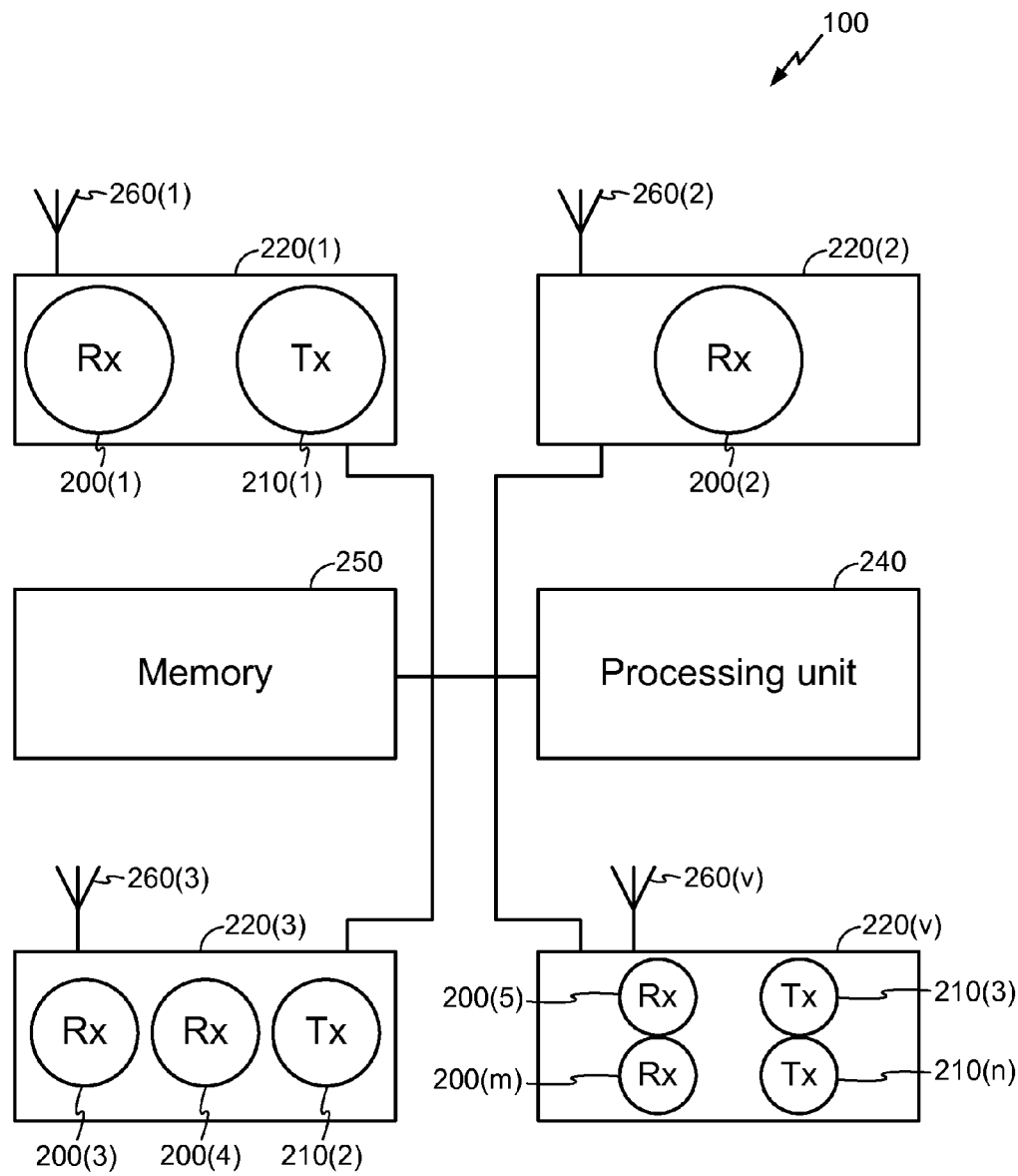
FIG. 2 is a functional block diagram of an exemplary wireless device shown in FIG. 1.

FIG. 2 is a functional block diagram of an exemplary wireless device shown in FIG. 1. Wireless device 100 comprises one or more modems (e.g., modems 220(1)-220(v)). Each modem 220(1)-220(v) comprises one or more receivers 200 and/or one or more transmitters 210. Further each modem comprises one or more antennas 260. Each modem 220(1)-220(v) may comprise any number of receivers 200(1)-200(m) and transmitters 210(1)-210(n). In one embodiment, some or all of the receivers 200(1)-200(m) and transmitters 210(1)-210(n) may be ultra wideband (UWB) devices. The sets of receivers 200(1)-200(m) and transmitters 210(1)-210(n) may include, for example, WiMAX, LTE, and/or 3G/4G devices. It is noted that n may or may not be equal to m. That is, the wireless device 100 may have more transmitters 210(1)-210(n) than receivers 200(1)-200(m), or vice versa. For example one or more modems 220(1)-220(v) may be a Global Positioning System (GPS) receiver or a television receiver. Accordingly, those modems 220(1)-220(v) may only have one or more receivers 200(1)-200(m). The wireless device 100 further includes a memory 250 and a processing unit 240 communicatively coupled to the memory 250. Receivers 200(1)-200(m) and transmitters 210(1)-210(n) may further be communicatively coupled to both the processing unit 240 and the memory 250. The wireless device 100 is not limited to any particular configuration, and various combinations of components, as well as other components, may be included in the wireless device 100.

The antenna(s) 260 may be configured to send and/or receive information to and/or from other devices and/or other base stations over one or more channels (e.g., frequency channels) and/or over one or more air interfaces. The information may comprise voice and/or data-only information (referred to herein as "information"). The antenna may comprise one or more physical and/or virtual antennas.

Each modem 220 may be configured to communicate with one or more base stations over one or more air interfaces and/or one or more channels as discussed with respect to FIG. 1. A modem may be in an active state when communicating with a base station and in an inactive state when not communicating. Any number of modems 220(1)-220(v) may be activated concurrently with any other modems 220(1)-220(v). For example, the wireless device 100 may exchange information with the base station 110a using the receiver 200(1) and the transmitter 210(1) of the modem 220(1). The wireless device 100 may receive/transmit information from/to the base station 110a via the antenna 260(1). The wireless device 100 may also receive information from the base station 110b using the receiver 200(2) of the modem 220(2). The wireless device 100 may receive information from the base station 110b via the antenna 260(2). Each modem 220 may send received information to the processing unit 240 for processing. Further each modem 220 may receive information to be transmitted from the processing unit 240. In addition each modem 220 may store/retrieve information to received/transmitted in/from the memory 250.

The processing unit 240 may be configured to process information transmitted/received via the antenna(s) 260. Further, the processing unit 240 may be configured to select one or more of the receiver(s) 200 and/or one or more of the transmitter(s) 210 to use for communication with a particular base station 110. Accordingly, the processing unit 240 may selectively turn on and turn off particular receiver(s) 200 and/or transmitter(s) 210. Further, the processing unit 240 may be configured to control the power levels and/or other aspects of operation of the various components of the device 100. For example, the processing unit 240 may be configured to determine if interference occurs between the one or more receivers 200 and/or the one or more transmitters 210. The processing unit 240 may then control the respective receiver(s) 200 and/or transmitter(s) 210 to avoid the interference as discussed below with respect to FIG. 3. The processing unit 240 may also be configured to read information from or write information to the memory 250.

Although described separately, it is to be appreciated that functional blocks described with respect to the device 100 need not be separate structural elements. For example, the receiver 200(1) and the transmitter 210(1) may be embodied in a single chip. The processing unit 240 may additionally, or in the alternative, contain memory, such as processor registers. Similarly, the processing unit 240 and the memory 250 may be embodied in a single chip.

The memory 250 may comprise processor cache, including a multi-level hierarchical cache in which different levels have different capacities and access speeds. The memory 250 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

One or more of the functional blocks and/or one or more combinations of the functional blocks described with respect to the device 100 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the device 100 may also be implemented as a combination of computing devices, e.g., a combination of a DSP and a microprocessor, a plurality of microprocessors, one or more microprocessors in conjunction with a DSP communication, or any other such configuration.

Figure 3:
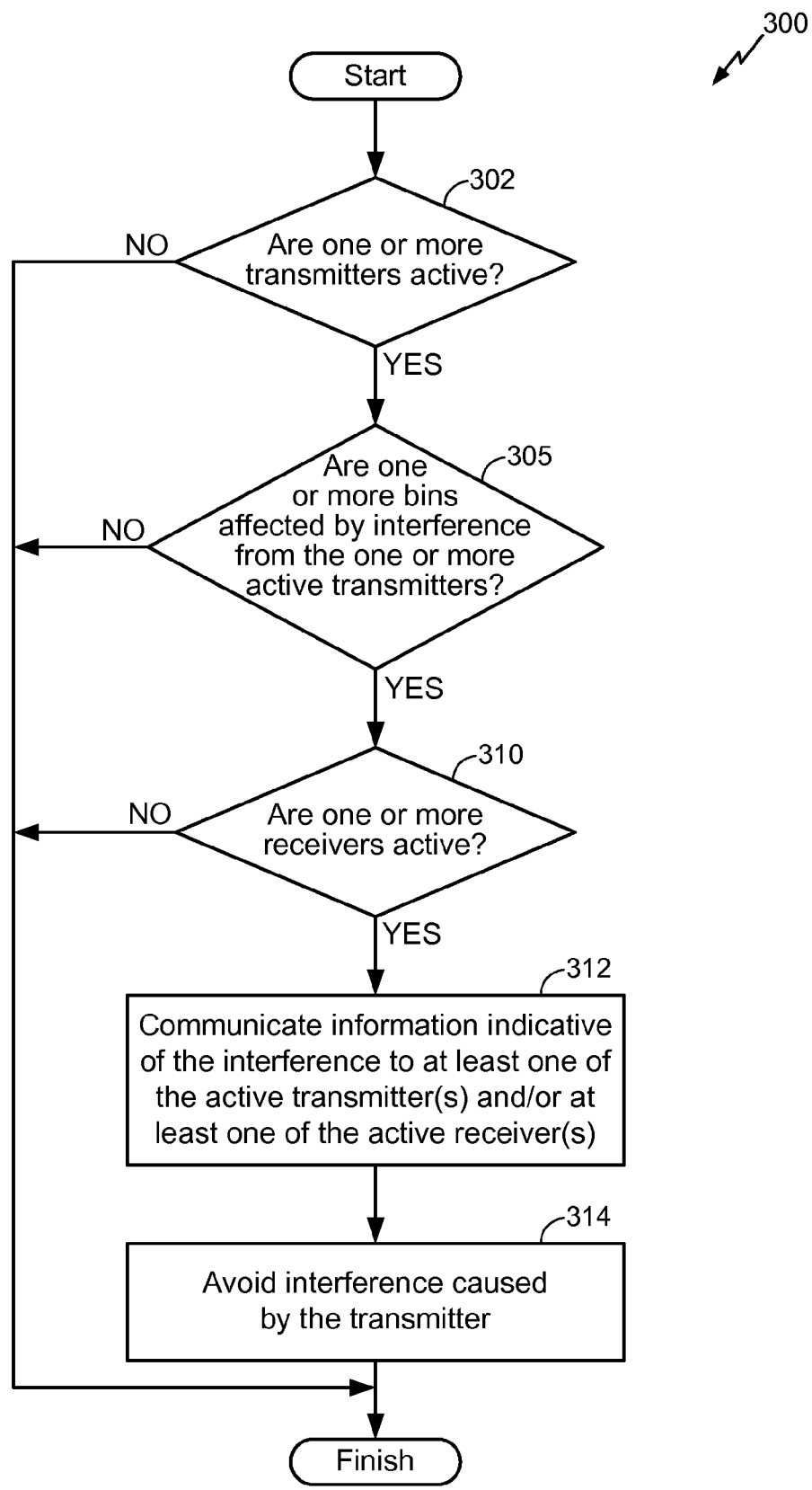
FIG. 3 is a flowchart of an exemplary process of avoiding interference between at least one transmitter and at least one receiver within at least one wireless device as shown in FIG. 2.

FIG. 3 is a flowchart of an exemplary process of avoiding interference between at least one transmitter and at least one receiver within at least one wireless device as shown in FIG. 2. It is noted that the at least one transmitter and the at least one receiver may or may not be within the same modem 220(1)-220(v). At a step 302, the processing unit 240 is determined, whether one or more transmitters 210(1)-210(n) are active. If the processing unit 240 determines one or more transmitters 210(1)-210(n) are not active, the process 300 ends. If the processing unit 240 determines one or more transmitters 210(1)-210(n) are active, the process 300 continues to step 305. Further, at the step 305 the processing unit 240 determines whether one or more OFDM bins (i.e., one or more frequency subbands) are affected by interference caused by the one or more active transmitters of the one or more transmitters 210(1)-210(n) based on information previously stored (e.g., pre-programmed) in memory 250. Information stored in the memory 250 may previously be known by the design of the wireless device 100. The information may comprise a magnitude of interference caused by one or more transmitters 210(1)-210(n) when active. The magnitude of the interference may be, for example, a function of various parameters, such as frequency, power and the type of antenna 260(1)-260(v), all of which may be determined and stored in the memory 250. The information may further comprise information indicative of the OFDM bins affected by the interference caused by the respective transmitter(s) 210(1)-210(n). If at the step 305 the processing unit 240 determines one or more OFDM bins are not affected by interference, the process 300 ends. If at the step 305 the processing unit 240 determines one or more OFDM bins are affected by interference, the process 300 continues to a step 310. At the step 310, the processing unit 240 determines if one or more receivers 200(1)-200(m) are active. If the processing unit 240 determines the one or more receivers 200(1)-200(m) are not active, the process 300 ends. If the processing unit 240 determines one or more receivers 200(1)-200(m) are active, the process 300 continues to a step 312. At the step 312, the information (e.g., information indicative of the interference) is communicated to at least one of the active transmitters 210(1)-210(n) and/or at least one of the active receivers 200(1)-200(m).

Further at a step 314, the interference caused by the one or more active transmitters of the one or more transmitter 210(1)-210(n) is avoided by at least one of the active transmitters 210(1)-210(n) and/or at least one of the active receivers 200(1)-200(m). Methods for avoiding the interference will be discussed in detail below.

One embodiment of step 314 of FIG. 3 comprises the processing unit 240 signaling the one or more active receivers 200(1)-200(m) to filter out the one or more OFDM bins that are affected by the interference. Thereby, the one or more active receivers 200(1)-200(m) avoid the interference caused by one or more of the transmitters 210(1)-210(n). For example, the one or more active receivers 200(1)-200(m) may filter out the OFDM bin(s) by use of a band-stop filter. In another embodiment, the one or more active receivers 200(1)-200(m) may use frequency equalization methods to filter out the OFDM bin(s). In one embodiment, at least one of the one or more transmitters 210(1)-210(n) and the one or more receivers 200(1)-200(m) is a UWB device. For example, by one exemplary method, a UWB receiver may avoid receiving OFDM bins that are affected by interference caused by one or more transmitters 210(1)-210(n). The impact of losing OFDM bins (i.e., the filtered affected OFDM bins) may be smaller than the impact of receiving bad symbols.

Another embodiment of step 314 of FIG. 3 comprises the processing unit 240 signaling the one or more active transmitters 210(1)-210(n) causing the interference affecting the one or more OFDM bins to attenuate transmissions at the one or more affected OFDM bins. Thereby, interference affecting one or more OFDM bins used by the one or more receivers 200(1)-200(m) is avoided. For example, the processing unit 240 may signal the one or more active transmitters 210(1)-210(n) causing the interference affecting the one or more OFDM bins to lower the power of transmission over the affected OFDM bins. For example, the processing unit 240 may signal the one or more active transmitters 210(1)-210(n) causing the interference affecting the one or more OFDM bins to lower the power of transmission over the affected OFDM bins to substantially 0. The embodiment described in paragraph [0040] may be used, for example, when the number of OFDM bins affected by the one or more active transmitters 210(1)-210(n) is significantly larger than the number of OFDM bins being affected at any particular receiver 200(1)-200(m). The embodiment described in paragraph [0040] may also be used, for example, when the one or more active transmitters 210(1)-210(n) is severely impacting the performance of the one or more active receivers 200(1)-200(m). The embodiment described in paragraph [0040] may further be used in other situations.

In one embodiment, information regarding which of the one or more receivers 200(1)-200(m) has been activated, as well as transmission over which OFDM bins has been attenuated, may be distributed to other systems (e.g., other UWB systems) within the same network. Further, the transmitters in other systems and/or in other nearby wireless devices 100 may receive the information and may attenuate transmissions at the one or more OFDM bins affected by interference caused by the one or more active transmitters 210(1)-210(n) in other systems. Moreover, receivers in other systems and/or in other nearby wireless devices 100 may receive the information that certain OFDM bins have been attenuated by the one or more nearby transmitters 210(1)-210(n).

In one embodiment, one or more of the transmitters 210(1)-210(n) may comprise a UWB transmitter and may attenuate transmissions on the frequency OFDM bins that affect one or more receivers of different systems. Information regarding the attenuation may be sent to other UWB devices. Accordingly, all UWB receivers know that the OFDM bins are not used, thus reducing the impact on the UWB system. Further, since other stations (e.g., other wireless devices 100) are aware of the information regarding the attenuation, the UWB receiver is safe from other UWB devices which are close by, but not necessarily within the same wireless device 100.

Yet another embodiment of step 314 of FIG. 3 comprises processing unit 240 signaling the one or more active transmitters 210(1)-210(n) causing the interference affecting the one or more OFDM bins to lower an overall transmission power across all frequencies. For example, the one or more active transmitters 210(1)-210(n) may be transmitting at the maximum rate, or the load may be relatively medium or low. Accordingly, the maximum transmission power can be lowered. In one embodiment, the maximum transmission power is lowered by lowering the maximum power of the one or more active transmitters 210(1)-210(n) without any protocol change or distribution of information.

In one embodiment one or more of the transmitters 210(1)-210(n) may comprise a UWB transmitter. The overall transmission power of the one or more UWB transmitter 210(1)-210(n) may be lowered to avoid interference. Lowering the overall transmission power may reduce the receiver desensitization (e.g., by a factor of three). In one embodiment where UWB devices are close to each other, the highest UWB rate may be achieved, even if lower than maximum transmission power is used. Hence, by lowering the overall transmission power, interference is avoided without impacting data rate. In another embodiment where other than maximum power is used, but the UWB channel is fully loaded, the power reduction reduces the rate.

The methods described with reference to step 314 of FIG. 3, may be used to avoid interference between one or more transmitters 210(1)-210(n) and one or more receivers 200(1)-200(m). Various considerations may be taken into account when selecting between the methods described herein. For example, one may consider if the number of OFDM bins affected by the one or more transmitters 210(1)-210(n) is significantly larger than the number of OFDM bins being affected at any particular receiver 200(1)-200(m). Or, one may consider that a particular transmitter 210(1)-210(n) is severely impacting the performance of a particular receiver 200(1)-200(m). In one embodiment, one may implement the method that has a minimum impact on the transmitter(s) 210(1)-210(n) and/or receiver(s) 200(1)-200(m) that is attenuated or filtered, and that provides a maximum improvement for the affected receiver(s) 200(1)-200(m). The method for avoiding interference may be selected algorithmically by the processing unit 240, may be preset in the wireless device 100, and/or may be selected by a user of the device 100.

Figure 4:
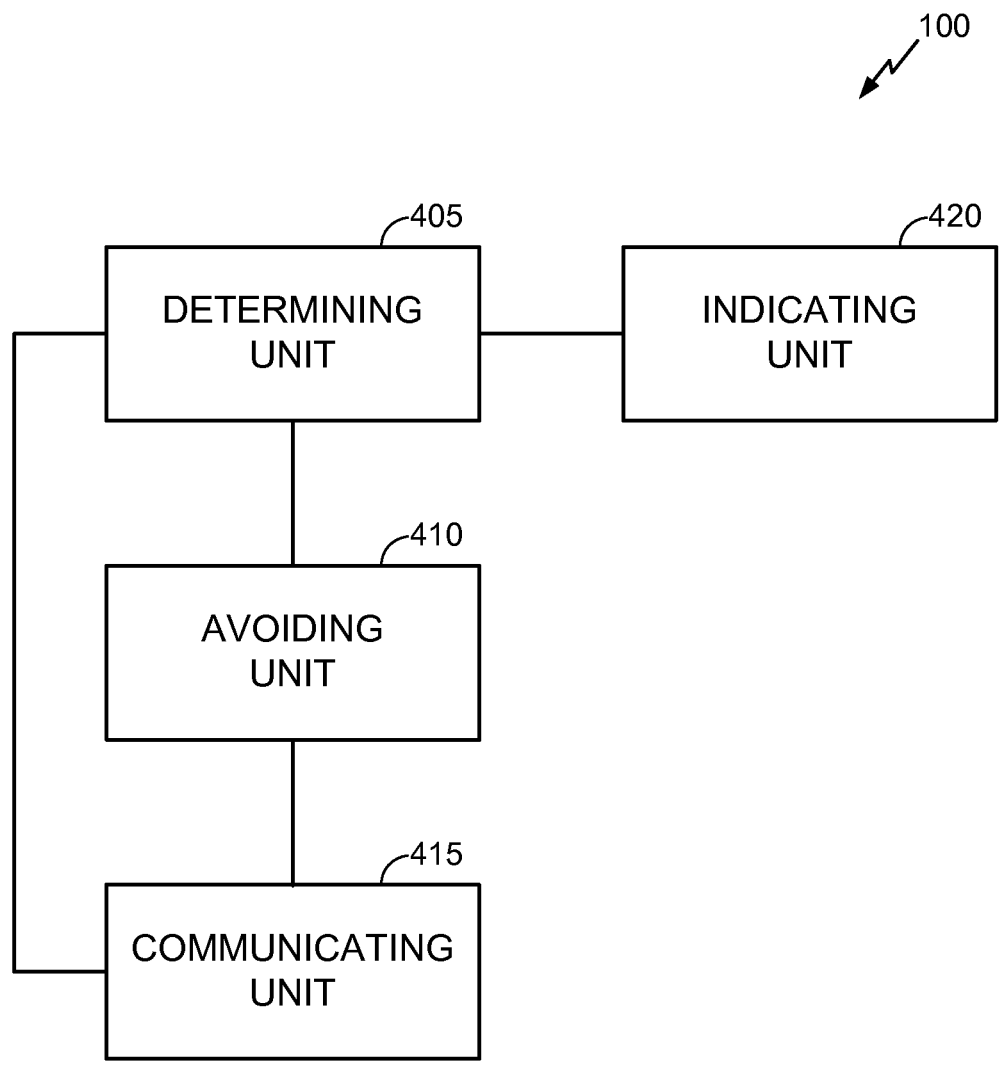
FIG. 4 is a functional block diagram of another exemplary wireless device shown in FIG. 1.

The functionality described herein (e.g., with regard to one or more of the accompanying figures) may correspond in some aspects to similarly designated "means for" functionality in the appended claims. Referring to FIG. 4, the wireless device 100 is represented as a series of interrelated functional modules.

FIG. 4 is a functional block diagram of another exemplary wireless device shown in FIG. 1. As shown, the wireless device 100 may comprise a determining unit 405, an avoiding unit 410, a communicating unit 415, and an indicating unit 420. The determining unit 405 may correspond at least in some aspects to, for example, a processing unit as discussed herein. The avoiding unit 410 may correspond at least in some aspects to, for example, one or more receivers, one or more transmitters, and/or a processing unit as discussed herein. The communicating unit 415 may correspond at least in some aspects to, for example, one or more transmitters as discussed herein. The indicating unit 420 may correspond at least in some aspects to, for example, a processing unit and/or one or more transmitters as discussed herein.

The functionality of the modules of FIG. 4 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

While the specification describes particular examples of the present invention, those of ordinary skill can devise variations of the present invention without departing from the inventive concept. For example, the teachings herein refer to networks with femto cells and macro cells but are equally applicable to networks with other topologies.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP communication, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor may read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method of avoiding interference between at least one transmitter and at least one receiver within at least one wireless device, comprising:
   determining whether one or more bins are affected by interference from said at least one transmitter based on predetermined information specific to said at least one transmitter;
   in response to determining that the one or more bins are affected by interference, determining an extent to which the one or more bins are affected by the interference;
   determining, based on the determined extent to which the one or more bins are affected by the interference, at least one of said at least one transmitter and said at least one receiver to which the predetermined information is to be communicated;
   communicating the predetermined information to the at least one of said at least one transmitter and said at least one receiver; and
   avoiding the interference from said at least one transmitter by the at least one of said at least one transmitter and said at least one receiver.

2. The method of claim 1, wherein determining the at least one of said at least one transmitter and said at least one receiver to which the predetermined information is to be communicated at least comprises determining that the predetermined information is to be communicated to said at least one transmitter if a number of bins affected by said at least one transmitter exceeds a threshold value or if a magnitude of the interference exceeds a threshold value.

3. The method of claim 1, wherein the predetermined information comprises a magnitude of the interference from said at least one transmitter and which of the one or more bins are affected by the interference from said at least one transmitter.

4. The method of claim 1, wherein the predetermined information comprises whether one or more receivers using the one or more bins affected by the interference from said at least one transmitter are activated.

5. The method of claim 1, wherein the avoiding comprises filtering, by said at least one receiver, the one or more bins affected by the interference from said at least one transmitter.

6. The method of claim 1, wherein the avoiding comprises attenuating, by said at least one transmitter, transmissions at the one or more bins affected by the interference from said at least one transmitter.

7. The method of claim 1, wherein the avoiding comprises lowering an overall transmission power of said at least one transmitter.

8. The method of claim 1, wherein said at least one transmitter and said at least one receiver are in a first mobile device.

9. The method of claim 8, further comprising communicating information indicative of the avoiding to at least a second mobile device.

10. The method of claim 1, wherein the at least one of said at least one transmitter and said at least one receiver comprises an ultra wideband device.

11. The method of claim 1, further comprising indicating to said at least one receiver that said at least one transmitter is active.

12. The method of claim 1, wherein the one or more bins comprise Orthogonal Frequency Division Multiplexing (OFDM) bins.

13. The method of claim 1, wherein the avoiding is performed using a fixed or a configurable notch filter.

14. An apparatus for avoiding interference between at least one transmitter and at least one receiver within at least one wireless device, comprising:
   a first processing circuit configured to:
      determine whether one or more bins are affected by interference from said at least one transmitter based on predetermined information specific to said at least one transmitter;
      determine, in response to determining that the one or more bins are affected by interference, an extent to which the one or more bins are affected by the interference;
      determine, based on the determined extent to which the one or more bins are affected by the interference, at least one of said at least one transmitter and said at least one receiver to which the predetermined information is to be communicated; and communicate the predetermined information to the at least one of said at least one transmitter and said at least one receiver; and a second processing circuit configured to mitigate the interference from said at least one transmitter by the at least one of said at least one transmitter and said at least one receiver.

15. The apparatus of claim 14, wherein the first processing circuit is further configured to determine the at least one of said at least one transmitter and said at least one receiver to which the predetermined information is to be communicated, at least in part by determining that the predetermined information is to be communicated to said at least one transmitter if a number of bins affected by said at least one transmitter exceeds a threshold value or if a magnitude of the interference exceeds a threshold value.

16. The apparatus of claim 14, wherein the predetermined information comprises a magnitude of the interference from said at least one transmitter and which of the one or more bins are affected by the interference from said at least one transmitter.

17. The apparatus of claim 14, wherein the predetermined information comprises whether one or more receivers using the one or more bins affected by the interference from said at least one transmitter are activated.

18. The apparatus of claim 14, wherein the second processing circuit is further configured to filter, by said at least one receiver, the one or more bins affected by the interference from said at least one transmitter.

19. The apparatus of claim 14, wherein the second processing circuit is further configured to attenuate, by the transmitter, transmissions at the one or more bins affected by the interference from said at least one transmitter.

20. The apparatus of claim 14, wherein the second processing circuit is further configured to lower an overall transmission power of said at least one transmitter.

21. The apparatus of claim 14, wherein said at least one transmitter and said at least one receiver are in a first mobile device.

22. The apparatus of claim 21, further comprising a third processing circuit configured to communicate information indicative of the avoiding to at least a second mobile device.

23. The apparatus of claim 14, wherein the at least one of said at least one transmitter and said at least one receiver comprises an ultra wideband device.

24. The apparatus of claim 14, further comprising a third processing circuit configured to indicate to said at least one receiver that said at least one transmitter is active.

25. The apparatus of claim 14, wherein the one or more bins comprise Orthogonal Frequency Division Multiplexing (OFDM) bins.

26. The apparatus of claim 14, wherein the second processing circuit comprises a fixed or a configurable notch filter.

27. An apparatus for avoiding interference between at least one transmitter and at least one receiver within at least one wireless device, comprising:
    means for determining whether one or more bins are affected by interference from said at least one transmitter, based on predetermined information specific to said at least one transmitter;
    means for determining, in response to determining that the one or more bins are affected by interference, an extent to which the one or more bins are affected by the interference;
    means for determining, based on the determined extent to which the one or more bins are affected by the interference, at least one of said at least one transmitter and said at least one receiver to which the predetermined information is to be communicated;
    means for communicating the predetermined information to the at least one of said at least one transmitter and said at least one receiver; and
    means for avoiding the interference from said at least one transmitter by at least one of said at least one transmitter and said at least one receiver if it is determined that the one or more bins are affected.

28. The apparatus of claim 27, wherein the means for determining at least comprises means for determining that the predetermined information is to be communicated to said at least one transmitter if a number of bins affected by said at least one transmitter exceeds a threshold value or if a magnitude of the interference exceeds a threshold value.

29. The apparatus of claim 27, wherein the predetermined information comprises a magnitude of the interference from said at least one transmitter and which of the one or more bins are affected by the interference from said at least one transmitter.

30. The apparatus of claim 27, wherein the predetermined information comprises whether one or more receivers using the one or more bins affected by the interference from said at least one transmitter are activated.

31. The apparatus of claim 27, wherein the means for avoiding comprises means for filtering, by said at least one receiver, the one or more bins affected by the interference from said at least one transmitter.

32. The apparatus of claim 27, wherein the means for avoiding comprises means for attenuating, by said at least one transmitter, transmissions at the one or more bins affected by the interference from said at least one transmitter.

33. The apparatus of claim 27, wherein the means for avoiding comprises means for lowering an overall transmission power of said at least one transmitter.

34. The apparatus of claim 27, wherein said at least one transmitter and said at least one receiver are in a first mobile device.

35. The apparatus of claim 34, further comprising means for communicating information indicative of the avoiding to at least a second mobile device.

36. The apparatus of claim 27, wherein the at least one of said at least one transmitter and said at least one receiver comprises an ultra wideband device.

37. The apparatus of claim 27, further comprising means for indicating to said at least one receiver that said at least one transmitter is active.

38. The apparatus of claim 27, wherein the one or more bins comprise Orthogonal Frequency Division Multiplexing (OFDM) bins.

39. The apparatus of claim 27, wherein the means for avoiding is performed using a fixed or a configurable notch filter.

40. A non-transitory computer-readable medium storing instructions thereon for performing a method of avoiding interference between at least one transmitter and at least one receiver within at least one wireless device, comprising:
    determining whether one or more bins are affected by interference from said at least one transmitter, based on predetermined information specific to said at least one transmitter;
    in response to determining that the one or more bins are affected by interference, determining an extent to which the one or more bins are affected by the interference;
    determining, based on the determined extent to which the one or more bins are affected by the interference, at least one of said at least one transmitter and said at least one receiver to which the predetermined information is to be communicated;

communicating the predetermined information to the at least one of said at least one transmitter and said at least one receiver; and avoiding the interference from said at least one transmitter by the at least one of said at least one transmitter and said at least one receiver.

41. The non-transitory computer-readable medium of claim 40, wherein determining the at least one of said at least one transmitter and said at least one receiver to which the predetermined information is to be communicated at least comprises determining that the predetermined information is to be communicated to said at least one transmitter if a number of bins affected by said at least one transmitter exceeds a threshold value or if a magnitude of the interference exceeds a threshold value.

42. The non-transitory computer-readable medium of claim 40, wherein the predetermined information comprises a magnitude of the interference from said at least one transmitter and which of the one or more bins are affected by the interference from said at least one transmitter.

43. The non-transitory computer-readable medium of claim 40, wherein the predetermined information comprises whether one or more receivers using the one or more bins affected by the interference from said at least one transmitter are activated.

44. The non-transitory computer-readable medium of claim 40, wherein the avoiding comprises filtering, by said at least one receiver, the one or more bins affected by the interference from said at least one transmitter.

45. The non-transitory computer-readable medium of claim 40, wherein the avoiding comprises attenuating, by said at least one transmitter, transmissions at the one or more bins affected by the interference from said at least one transmitter.

46. The non-transitory computer-readable medium of claim 40, wherein the avoiding comprises lowering an overall transmission power of said at least one transmitter.

47. The non-transitory computer-readable medium of claim 40, wherein said at least one transmitter and said at least one receiver are in a first mobile device.

48. The non-transitory computer-readable medium of claim 47, wherein the method further comprises communicating information indicative of the avoiding to at least a second mobile device.

49. The non-transitory computer-readable medium of claim 40, wherein the at least one of said at least one transmitter and said at least one receiver comprises an ultra wideband device.

50. The non-transitory computer-readable medium of claim 40, wherein the method further comprises indicating to said at least one receiver that said at least one transmitter is active.

51. The non-transitory computer-readable medium of claim 40, wherein the one or more bins comprise Orthogonal Frequency Division Multiplexing (OFDM) bins.

52. The non-transitory computer-readable medium of claim 40, wherein the avoiding is performed using a fixed or a configurable notch filter.

53. A processor configured to execute instructions for performing a method of avoiding interference between at least one transmitter and at least one receiver within at least one wireless device, the method comprising:

determining whether one or more bins are affected by interference from said at least one transmitter, based on predetermined information specific to said at least one transmitter;

in response to determining that the one or more bins are affected by interference, determining an extent to which the one or more bins are affected by the interference;

determining, based on the determined extent to which the one or more bins are affected by the interference, at least one of said at least one transmitter and said at least one receiver to which the predetermined information is to be communicated;

communicating the predetermined information to the at least one of said at least one transmitter and said at least one receiver; and avoiding the interference from said at least one transmitter by the at least one of said at least one transmitter and said at least one receiver.

54. The processor of claim 53, wherein determining the at least one of said at least one transmitter and said at least one receiver to which the predetermined information is to be communicated at least comprises determining that the predetermined information is to be communicated to said at least one transmitter if a number of bins affected by said at least one transmitter exceeds a threshold value or if a magnitude of the interference exceeds a threshold value.

55. The processor of claim of claim 53, wherein the predetermined information comprises a magnitude of the interference from said at least one transmitter and which of the one or more bins are affected by the interference from said at least one transmitter.

56. The processor of claim 53, wherein the predetermined information comprises whether one or more receivers using the one or more bins affected by the interference from said at least one transmitter are activated.

57. The processor of claim 53, wherein the avoiding comprises filtering, by said at least one receiver, the one or more bins affected by the interference from said at least one transmitter.

58. The processor of claim 53, wherein the avoiding comprises attenuating, by said at least one transmitter, transmissions at the one or more bins affected by the interference from said at least one transmitter.

59. The processor of claim 53, wherein the avoiding comprises lowering an overall transmission power of said at least one transmitter.

60. The processor of claim 53, wherein said at least one transmitter and said at least one receiver are in a first mobile device.

61. The processor of claim 60, wherein the method further comprises communicating information indicative of the avoiding to at least a second mobile device.

62. The processor of claim 53, wherein the at least one of said at least one transmitter and said at least one receiver comprises an ultra wideband device.

63. The processor of claim 53, wherein the method further comprises indicating to said at least one receiver that said at least one transmitter is active.

64. The processor of claim 53, wherein the one or more bins comprise Orthogonal Frequency Division Multiplexing (OFDM) bins.

65. The processor of claim 53, wherein the avoiding is performed using a fixed or a configurable notch filter.

66. The method of claim 1, wherein avoiding the interference comprises lowering a transmission power of said at least one transmitter over the one or more bins affected by interference.

67. The apparatus of claim 14, wherein the second processing circuit is further configured to lower a transmission power of said at least one transmitter over the one or more bins affected by interference.

68. The apparatus of claim 27, wherein the means for avoiding the interference comprises means for lowering a transmission power of said at least one transmitter over the one or more bins affected by interference.

69. The non-transitory computer-readable medium of claim 40, wherein avoiding the interference comprises lowering a transmission power of said at least one transmitter over the one or more bins affected by interference.

70. The processor of claim 53, wherein avoiding the interference comprises lowering a transmission power of said at least one transmitter over the one or more bins affected by interference.

\* \* \* \* \*